(12) United States Patent
Singh et al.

(10) Patent No.: US 9,989,756 B2
(45) Date of Patent: Jun. 5, 2018

(54) MOTION SENSING AND ENERGY CAPTURING APPARATUS, SYSTEM AND METHODS

(71) Applicant: Walmart Apollo, LLC, Bentonville, AR (US)

(72) Inventors: Abhishek Singh, Herndon, VA (US); Aditya Maroo, Bentonville, AR (US); Ajay Kumar Gautam, Bentonville, AR (US); Suyash Kotpalliwar, Bentonville, AR (US); Peter Ojezua, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days. days.

(21) Appl. No.: 15/654,033

(22) Filed: Jul. 19, 2017

(65) Prior Publication Data

US 2018/0024352 A1  Jan. 25, 2018

Related U.S. Application Data

(60) Provisional application No. 62/365,036, filed on Jul. 21, 2016.

(51) Int. Cl.
*G02B 26/08* (2006.01)
*G06K 9/00* (2006.01)
(Continued)

(52) U.S. Cl.
CPC ..... *G02B 26/0858* (2013.01); *G06K 9/00778* (2013.01); *G06Q 30/02* (2013.01); *G06T 7/20* (2013.01)

(58) Field of Classification Search
CPC ........... G06K 7/10366; G06K 19/0723; G06K 2017/0045; G06K 7/0008;
(Continued)

(56) References Cited

U.S. PATENT DOCUMENTS 6,958,677 B1 * 10/2005 Carter ................... G06K 17/00
340/10.1
7,133,659 B2   11/2006 Zalewski
(Continued)

OTHER PUBLICATIONS

Application and File History for U.S. Appl. No. 15/659,806, filed Jul. 26, 2017, Inventor Puthalath et al.
(Continued)

*Primary Examiner* — Mark Blouin
(74) *Attorney, Agent, or Firm* — Patterson Thuente Pedersen, P.A.

(57) ABSTRACT

Embodiments relate to systems and methods for motion sensing and energy capturing. In an embodiment, a motion sensing and energy capturing system comprises a plurality of piezoelectric elements configured to be arranged in a walking surface, each of the plurality of piezoelectric elements being identifiable relative to a portion of the walking surface; a communications module coupled with the plurality of piezoelectric elements; a processing engine configured to receive via the communications module activation data from at least one of the plurality of piezoelectric elements when the at least one of the piezoelectric elements is activated by activity on a corresponding portion of the walking surface, the activation data including time of activation data, and to process the activation data received for the walking surface over a period of time to identify a time-varying traffic pattern; a user interface configured to display the time-varying traffic pattern; and an energy capture element electrically coupled with the plurality of piezoelectric elements to receive energy produced by the at least one of the plurality of piezoelectric elements when the at least one of the piezoelectric elements is activated by activity on a corresponding portion of the walking surface.

20 Claims, 5 Drawing Sheets

(51) Int. Cl.
*G06Q 30/02* (2012.01)
*G06T 7/20* (2017.01)

(58) Field of Classification Search
CPC ..... G06K 19/07758; G06K 2017/0051; G06K 7/10099; G06K 7/10475
USPC .......................................................... 340/8.1
See application file for complete search history.

(56) References Cited

U.S. PATENT DOCUMENTS

| | | | |
|---|---|---|---|
| 7,562,729 B2 | 7/2009 | Haemmerle | |
| 7,658,247 B2 | 2/2010 | Carter | |
| 7,974,889 B2 | 7/2011 | Raimbeault | |
| 8,046,160 B2 * | 10/2011 | Carter | A47F 10/04 340/539.13 |
| 8,120,190 B2 | 2/2012 | Bravo | |
| 8,417,445 B2 | 4/2013 | Hannah | |
| 8,560,357 B2 | 10/2013 | Sickenius | |
| 8,651,389 B2 | 2/2014 | Shastri | |
| 9,264,151 B1 | 2/2016 | Emigh | |
| 2007/0067222 A1 | 3/2007 | Godsey | |
| 2008/0249870 A1 | 10/2008 | Angell | |
| 2013/0217333 A1 | 8/2013 | Sprigg | |
| 2013/0226655 A1 | 8/2013 | Shaw | |
| 2013/0246175 A1 | 9/2013 | Bilange | |
| 2014/0172553 A1 | 6/2014 | Goulart | |
| 2014/0365273 A1 | 12/2014 | Hurewitz | |
| 2015/0242899 A1 | 8/2015 | Farhi | |
| 2016/0023675 A1 | 1/2016 | Hannah | |

OTHER PUBLICATIONS

Application and Filing Receipt for U.S. Appl. No. 15/724,323, filed Oct. 4, 2017, Inventor Jones et al.
Supermarket Costumers Routes-and-Times Identifier, Communications Conference (COLCOM), *IEEE Columbian*, dated May 16-18, 2012, 2 pages.
Bauman, Sarah, *Store Layout, Design, and Visual Merchandising*, 2014, 72 pages, as obtained from https://www.slideshare.net/sarahbauman52509/retail-mangement-presentation, on Jan. 17, 2018.
Bauman, Sarah, *Retail Management Presentation*, 7 pages, as obtained on Apr. 22, 2016.

* cited by examiner

MOTION SENSING AND ENERGY CAPTURING APPARATUS, SYSTEM AND METHODS

RELATED APPLICATION

The present application claims the benefit of U.S. Provisional Application No. 62/365,036 filed Jul. 21, 2016, which is hereby incorporated herein in its entirety by reference.

TECHNICAL FIELD

Embodiments relate generally to motion sensing, and more particularly to apparatus, systems and methods comprising piezoelectric elements that can provide both motion sensing over time and energy capture from foot traffic.

BACKGROUND

Retailers generally desire to arrange their stores in ways that are convenient for customers. For example, efforts can be made to place products in locations in which it will be intuitive for customers to look for them or where complementary products are arranged together. Retailers also can arrange some products in temporary locations if they are on sale or special offer or otherwise being featured. Determining these factors (i.e., intuitive locations, complementary products, temporary locations for featured products) can be challenging.

Additionally, customer traffic can vary in different parts of stores at different times of day. In the morning, customers may make quick stops to purchase toiletries or items needed for a day at work or school, while in the late afternoon or evening customers may stop to buy groceries and other items for evening meals. Identifying these time-varying traffic patterns also can be useful to retailers but challenging to do.

SUMMARY

In an embodiment, a motion sensing and energy capturing system comprises a plurality of piezoelectric elements configured to be arranged in a walking surface, each of the plurality of piezoelectric elements being identifiable relative to a portion of the walking surface; a communications module coupled with the plurality of piezoelectric elements; a processing engine configured to receive via the communications module activation data from at least one of the plurality of piezoelectric elements when the at least one of the piezoelectric elements is activated by activity on a corresponding portion of the walking surface, the activation data including time of activation data, and to process the activation data received for the walking surface over a period of time to identify a time-varying traffic pattern; a user interface configured to display the time-varying traffic pattern; and an energy capture element electrically coupled with the plurality of piezoelectric elements to receive energy produced by the at least one of the plurality of piezoelectric elements when the at least one of the piezoelectric elements is activated by activity on a corresponding portion of the walking surface.

In an embodiment, a method of motion sensing and energy capturing comprises providing a plurality of piezoelectric elements configured to be arranged in a walking surface, each of the plurality of piezoelectric elements being identifiable relative to a portion of the walking surface and activateable by activity on a corresponding portion of the walking surface; providing a communications module configured to be coupled with the plurality of piezoelectric elements; configuring the communications module to send activation data comprising time of activation data and related to at least one of the plurality of piezoelectric elements to a processing engine configured to process the activation data received for the walking surface over a period of time to identify a time-varying traffic pattern; and providing an energy capture element configured to be electrically coupled with the plurality of piezoelectric elements to receive energy produced by the at least one of the plurality of piezoelectric elements when the at least one of the piezoelectric elements is activated by activity on a corresponding portion of the walking surface.

BRIEF DESCRIPTION OF THE DRAWINGS

Embodiments may be more completely understood in consideration of the following detailed description of various embodiments in connection with the accompanying drawings, in which.

DETAILED DESCRIPTION

Figure 1:
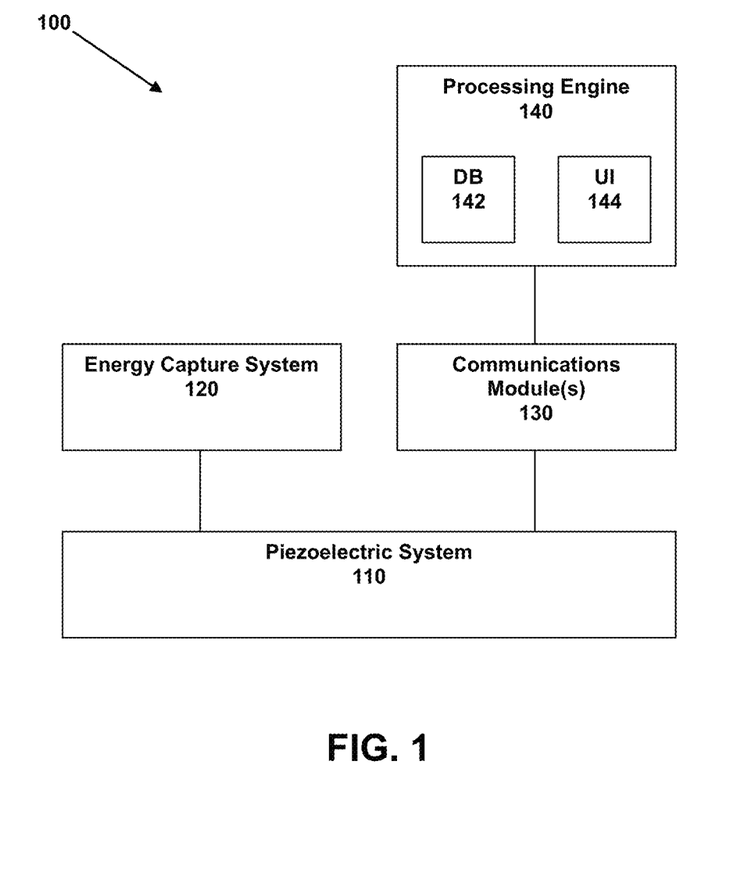
FIG. 1 is a block diagram of a motion sensing and energy capturing system according to an embodiment.

Referring to FIG. 1, an embodiment of a motion sensing and energy capturing system 100 is depicted. System 100 comprises a piezoelectric system 110, an energy capture system 120, a communication module 130, and a processing engine 140.

Piezoelectric system 110 comprises piezoelectric elements, sensors, transducers or other devices that use the piezoelectric effect to sense or measure a physical change in pressure or force (or some other physical characteristic, such as temperature) and convert that change into an electrical signal or charge. In embodiments of system 100, some or all of piezoelectric system 110 can be embedded in or arranged on or under a floor or other walking surface to detect people walking, standing or otherwise moving on the floor or other surface. In various embodiments, piezoelectric system 110 can comprise a grid of piezoelectric elements and related circuitry coupled, electrically and/or mechanically, in a grid, a plurality of grids or sub-grids, or some other arrangement. Alternatively, some or all of piezoelectric system 110 can comprise individual, uncoupled piezoelectric elements.

Figure 2:
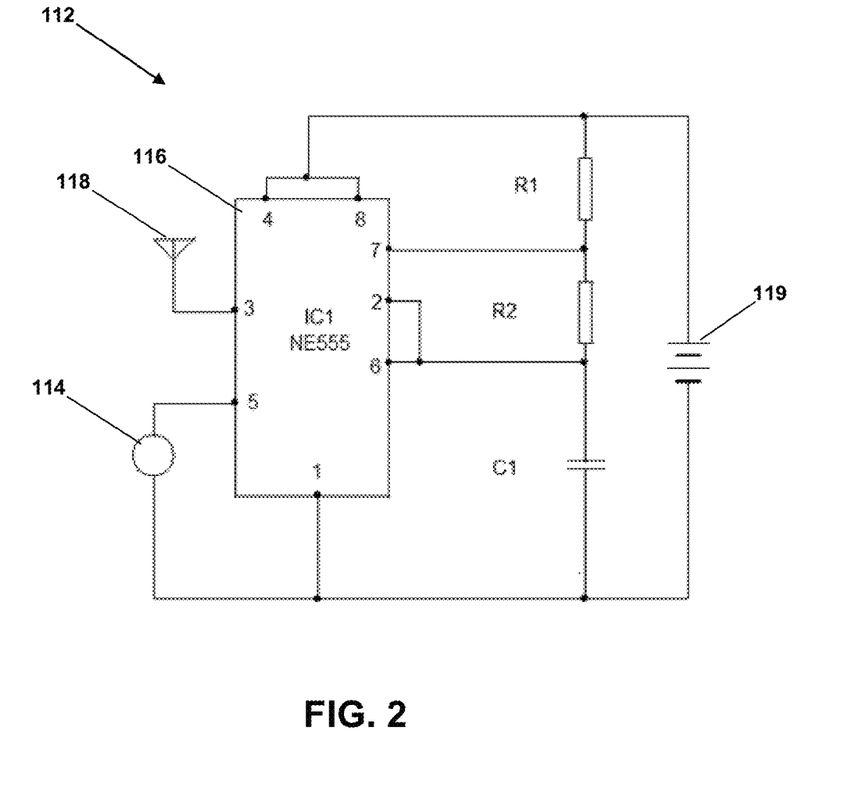
FIG. 2 is a piezoelectric circuit diagram according to an embodiment.

Referring to FIG. 2, an example of a piezoelectric circuit 112 of piezoelectric system 110 is depicted. Piezoelectric system 110 comprises a plurality of piezoelectric circuits 112 in embodiments, distributed throughout a retail store or other facility. Piezoelectric circuit 112 comprises a piezoelectric element 114, a timer integrated circuit (IC) 116, wireless transmitter circuitry 118 and a battery 119 in one embodiment. In some embodiments, two or more piezoelectric elements 114 can be included in a single piezoelectric circuit 112.

Piezoelectric element 114 is a sensor or other device that reacts to mechanical stress (e.g., pressure from a person stepping or walking on the floor on or over piezoelectric element 114) by producing an electrical signal. This signal is communicated to IC 116, which in one embodiment comprises an NE555 timer integrated circuit, though in other embodiments can comprise other or additional timing or clocking circuitry. IC 116 in turn generates a pulse that is communicated to wireless transmitter circuitry 118 for radio frequency (RF) or other wireless transmission (e.g., WIFI, near-field, Bluetooth) to wireless receiver circuitry, which can be part of piezoelectric system 110 or communications module 130 (discussed below), or both, in various embodiments. In one embodiment, wireless transmitter circuitry 118 emits a low frequency RF signal that includes an identifier of piezoelectric element 114 so that the signal source can be localized; i.e., each of the plurality of piezoelectric circuits 112 is located in a particular location in a store or facility, and a mapping can be performed to cross-reference identifiers with known locations. The mapping can be stored in processing engine 140, though in some embodiments it can be stored, additionally or alternatively, in communications module 130 and/or piezoelectric system 110. The identifier can be stored in IC 116 of each piezoelectric circuit 112.

Battery 119 is electrically coupled with piezoelectric element 114, IC 116 and wireless transmitter circuitry 118 to provide power to these and other elements of piezoelectric circuit 112. In one embodiment, battery 119 comprises a 9V battery, though the capacity of battery 119 can be lesser or greater in other embodiments. In still other embodiments, battery 119 can be omitted or can be a back-up power source, with piezoelectric circuit 112 being hardwired to a power source or receiving power from energy capture system 120 or another source instead.

In embodiments, activation of piezoelectric element 114 in piezoelectric circuit 112 results in one or more signals that provide several data elements: activation data, location data, and time data. The time data is associated with a time of activation or piezoelectric element 114 in one embodiment and can come from piezoelectric circuit 112, such as IC 116. In another embodiment, the time data can be associated with a time of pulse transmission or receipt, such as by wireless transmitter circuitry 118 and corresponding wireless receiver circuitry, which can be part of communications module 130 or piezoelectric system 110 (or both) in various embodiments and is discussed below. Thus, in embodiments piezoelectric system 110 can provide or results in activation information or data (when someone walks on the floor proximate one or more of the piezoelectric elements), location information (identifying the particular element or place where the activation took place), and time information (identifying when the activation of the particular element took place or when a signal related to the activation was sent or received). In some embodiments, the location information can be combined with or embedded in the activation data, directly or indirectly, such that it can be determined or extracted from the activation data by one or more components of system 100 (e.g., piezoelectric system 110, communications module 130 and/or processing engine 140). In still other embodiments, the activation and location data can be one data item or element—i.e., activation of a piezoelectric element 114 is inherent to the generation or reporting of location data.

As previously mentioned, piezoelectric elements 114 of piezoelectric system 110 sense or measure a physical change in a physical characteristic and convert that change into an electrical signal or charge. In embodiments that charge can be captured by energy capture system 120. Energy capture system 120 is electrically coupled with piezoelectric system 110 to receive electrical charge from piezoelectric elements 114 thereof. In some embodiments, energy capture system 120 can comprise one or more capacitors, batteries or other energy storage devices. In other embodiments, energy capture system 120 can, additionally or alternatively, comprise circuitry configured to regulate and feed electrical charge from piezoelectric system 110 to other devices needing electric energy to operate. For example, energy can be provided to power other devices in system 100 and/or energy can be fed to other devices or systems in the environment in which system 100 is deployed (e.g., to the lighting, HVAC, or other systems in a retail store in which piezoelectric system 110 are embedded in the floor). In embodiments, energy capture system 120 can enable system 100 to be partially or fully self-powering when in operation.

In addition to be electrically coupled with energy capture system 120, piezoelectric system 110 is communicatively coupled with communications module 130. This communicative coupling can be wired, wireless or a combination thereof in various embodiments. In wireless embodiments, the communications can be via RF, WIFI, near-field communications (NFC), Bluetooth, or some other wireless communication technique. Communications module 130 is configured to receive data or information from piezoelectric system 110, as previously discussed. In one embodiment, communications module 130 comprises an RF receiver to receive the low frequency RF signals emitted by communications circuitry 118 of each piezoelectric circuit 112 of piezoelectric system 110. In such an embodiment, communications module 130 can record receipt of the RF signal and append a time stamp, thereby providing the aforementioned time data. In embodiments, the signal recording can be based on a time series implementation, such as Elasticsearch. The time between the actual activation of piezoelectric element 114 and the sending and receiving of the pulse by communications circuitry 118 and communications module 130 typically is not significant or critical, but as previously mentioned in some embodiments the time information can be provided by piezoelectric circuit 112, closer in time to the actual activation.

In some embodiments, system 100 comprises one communications module 130 that communicates with each piezoelectric circuit 112 of piezoelectric system 110. In other embodiments, and referring to FIG. 3, system 100 can comprise a plurality of communications modules 130a, 130b, 130c, 130d. This can be beneficial or necessary in large areas in which wireless communications signal quality may be degraded because of distance between some piezoelectric circuits 112 and communications module 130.

Figure 3:
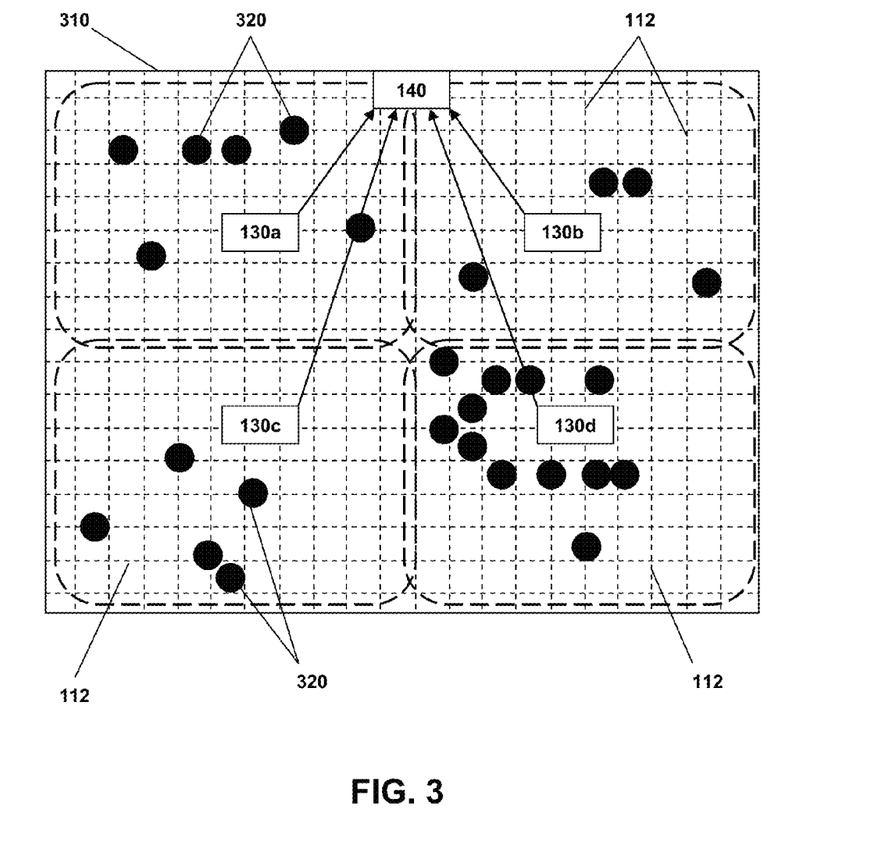
FIG. 3 is a top view of a diagram of a retail space in which a motion sensing and energy capturing system is deployed according to an embodiment.

In FIG. 3, four communications modules 130a, 130b, 130c, 130d are distributed throughout a retail store 310. Each communications module 130a, 130b, 130c, 130d has a corresponding range or territory 312a, 312b, 312c, 312d, wherein any piezoelectric circuits 112 (represented by the grid lines in FIG. 3) in those ranges 312a, 312b, 312c, 312d communicate with a corresponding communications module 130a, 130b, 130c, 130d. FIG. 3 is not drawn to scale, and there may be more or fewer communications modules 130, or more or fewer piezoelectric circuits 112, in various implementations. For example, piezoelectric circuits 112 need not be distributed regularly or consistently, as it may be desired in some applications to track activity in some departments of a store but not others. In another example, it may be possible to track activity in an aisle by placing piezoelectric circuits 112 at each end or entry to the aisle, rather than throughout the aisle. Piezoelectric system 110 can comprise tens, hundreds, thousands or even more of piezoelectric circuits 112 and elements 114. In other words, a variety of arrangements can be implemented according to user preference, area or configuration, or other characteristics.

In embodiments comprising a plurality of communications modules 130, a variety of data transmission and receipt schemes can be implemented, such as hub-and-spoke, hopping, or others. For example, and as in FIG. 3, retail store 310 may have several communications modules 130a-d that each communicate directly with processing engine 140. In another embodiment, one "master" communications module 130 receives data from other communications modules and carries out some consolidation, concatenation, processing or other activity related to the data received from the other communications modules 130 before communicating that data to processing engine 140. In yet another embodiment, a "hopping" arrangement can be implemented—i.e., communications module 130c can send its data to communications module 130a, communications module 130d can send its data to communications module 130b, and then communications modules 130a and 130b can send their data and the data from communications modules 130c and 130d, respectively, on to processing engine 140. Still other data transmission techniques and schemes can be used in other embodiments as will be appreciated by those of skill in the art.

In still other embodiments, communications module 130 can be partially or fully integrated with piezoelectric system 110 or related circuitry, or with processing engine 140. In a further embodiment, communications module 130 can be omitted, with a more direct communicative connection provided between piezoelectric system 110 and processing engine 140.

Referring also to FIG. 1, processing engine 140 is communicatively coupled with communications module 130 to receive data and information therefrom, particularly with respect to piezoelectric system 110, and store that data in a database 142. Processing engine 140 is configured to process this data and information to identify traffic patterns, in particular time-varying traffic patterns that can be used to generate "heat maps," in the retail or other environment in which piezoelectric system 110 is arranged. The data, traffic patterns, heat maps and other related information can be displayed, output or otherwise provided via a user interface 144.

Figure 4:
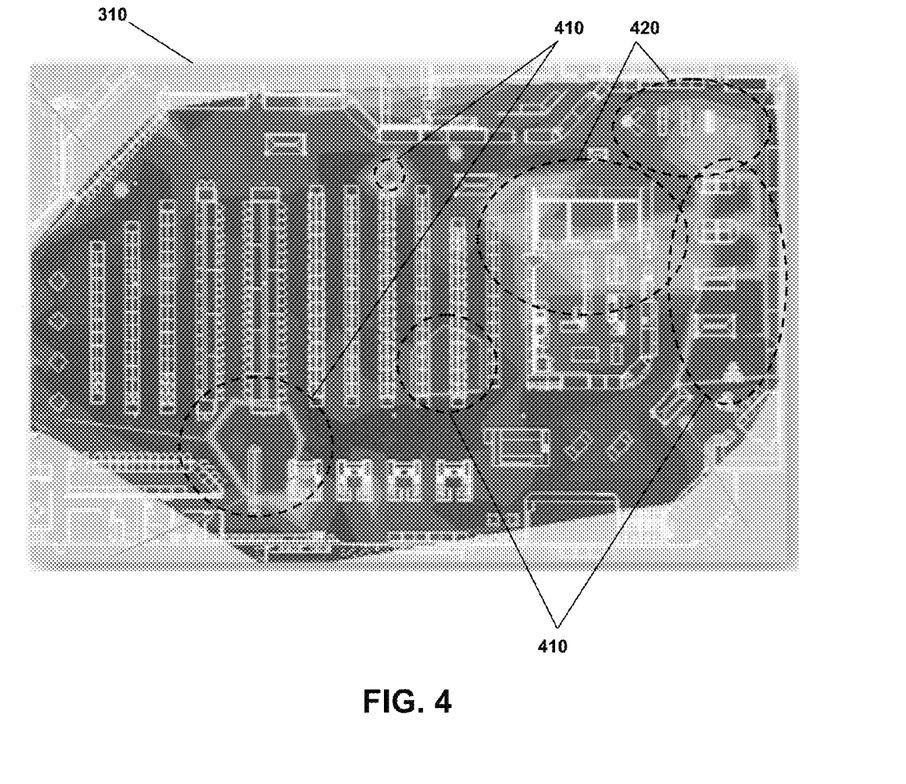
FIG. 4 is a heat map produced by a motion sensing and energy capturing system according to an embodiment.

Referring again to FIG. 3, people 320, carts or other objects standing or moving in retail store 310 can be detected by piezoelectric system 110 as previously discussed. In this sense, FIG. 3 is a snapshot in time of activity in store 310. As data (i.e., activation data, location data, from piezoelectric circuits 112 is generated and recorded over time by processing engine 140, that data can be processed and analyzed. In one embodiment, this processing and analysis can produce a heat map as shown in FIG. 4. The heat map, via different colors, shows areas 410 of relatively high traffic, areas 420 of moderate traffic, and other areas of low or very low traffic. While the heat map of FIG. 4 is static and taken a particular moment in time, processing engine 140 and user interface 144 can present the heat map over time, as an animation or sequential presentation of a series of heat maps taken at particular times. Processing engine 140 and user interface 144 also can present multiple heat maps simultaneously (e.g., side by side, overlaid, etc.) in order to enable a user to compare data taken at a different times, on different days, in different stores, etc. In embodiments, database 142 can store the underlying data and/or the heat maps for a period of time.

The heat map of FIG. 4 is one example of a depiction of traffic data over time, and other depictions can be used in other embodiments. Additionally, processing engine 130 can provide, via user interface 144, underlying data, processed data, and other characteristics and information about system 100. For example, user interface 144 can comprise a visual display (e.g., a monitor, screen, tablet, smart phone, laptop, projector) and a user input device (e.g., a mouse, a keyboard, a touchscreen, a laser pointer) that enables a user to interact with processing engine 140 to manipulate the display or data. By clicking on an area of the store, user interface 144 can present information about the department or products offered, a foot traffic count, staffing levels, stocking schedules, how long items have been stocked in that particular location, and other characteristics. A user further can use user interface 144 to request or have generated by processing engine 140 various visuals and reports that can be output by an output device of user interface 144 (e.g., a printer, an email system, a document generator).

This data and information can be used for a variety of purposes. For example, store management can use the data to plan or alter store layouts to provide a better and more convenient customer experience; advertise and display merchandise more effectively in the store; schedule restocking, cleaning, or maintenance during non-peak times of day (or immediately before or after peak times of day) in particular departments or areas of the store; and for other purposes. Data and information from system 100 also can be used to determine staffing levels and assignments throughout stores during the day, or to determine placement of product demonstrators or sample stations.

Figure 5:
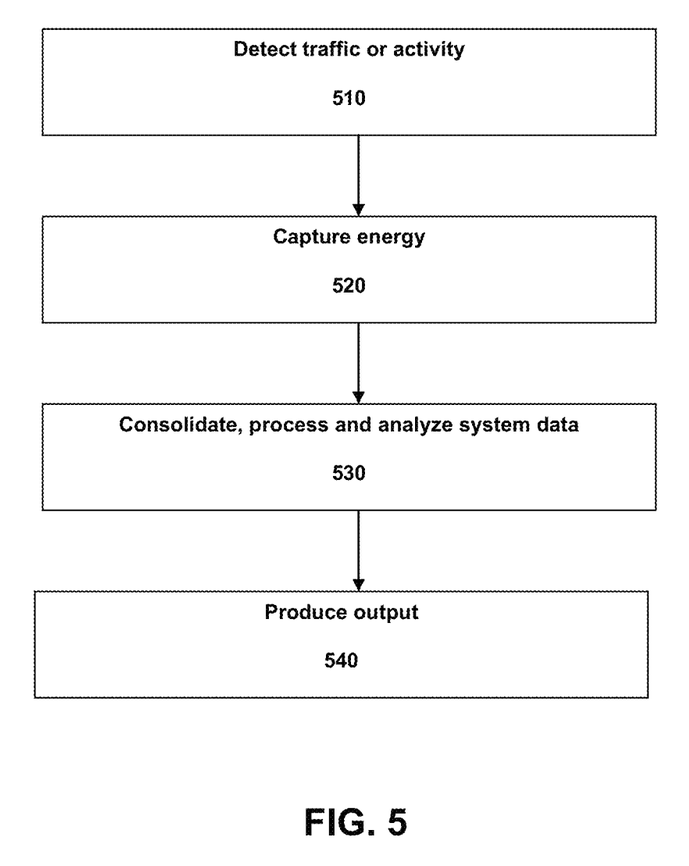
FIG. 5 is a flowchart of a motion sensing and energy capturing method according to an embodiment.

A method related to system 100 is depicted in FIG. 5. At 510, foot traffic or other activity is detected by a piezoelectric element embedded in a floor or other surface. At 520, energy related to activation of the piezoelectric element is captured for use (e.g., in system 100, in store 310, or in some other place or way). At 530, data from a plurality of piezoelectric elements in system 100 is consolidated, processed and analyzed at or over time, and at 540 system 100 produces an output display, report or other product or result. The particular order of tasks depicted in FIG. 5 can be rearranged in other embodiments, additional tasks can be added, or one or more tasks can be omitted.

While examples given herein have related to retail stores and environments, system 100 can be deployed in other settings, such as hospitals, schools, arenas, public spaces, offices, amusement parks, entertainment districts, sidewalks, theaters, or virtually any indoor or outdoor area in which foot or other traffic patterns are desired to be viewed and analyzed. The piezoelectric elements can be embedded in, on or under surfaces other than flooring, such as seating surface, and in some embodiments technologies other than piezoelectric can be used.

In embodiments, system 100 and/or its components or systems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A motion sensing and energy capturing system comprising:
   a plurality of piezoelectric elements configured to be arranged in a walking surface, each of the plurality of piezoelectric elements being identifiable relative to a portion of the walking surface;
   a communications module coupled with the plurality of piezoelectric elements;
   a processing engine configured to receive via the communications module activation data from at least one of the plurality of piezoelectric elements when the at least one of the piezoelectric elements is activated by activity on a corresponding portion of the walking surface, the activation data including time of activation data, and to process the activation data received for the walking surface over a period of time to identify a time-varying traffic pattern;
   a user interface configured to display the time-varying traffic pattern; and
   an energy capture element electrically coupled with the plurality of piezoelectric elements to receive energy produced by the at least one of the plurality of piezoelectric elements when the at least one of the piezoelectric elements is activated by activity on a corresponding portion of the walking surface.

2. The system of claim 1, wherein the energy capture element is electrically coupled with at least one of the communications module, the processing engine or the user interface to provide received energy thereto.

3. The system of claim 1, wherein the walking surface is a floor in a building.

4. The system of claim 3, wherein the energy capture element is electrically coupled with at least one electrical system in the building to provide the received energy thereto.

5. The system of claim 3, wherein the building is a retail store and the time-varying traffic pattern is related to customer activity in the retail store.

6. The system of claim 5, wherein the processing engine is configured to analyze the time-varying traffic pattern to identify at least one area of the store with high customer activity for additional merchandising, and wherein the user interface is configured to display the at least one area of the store.

7. The system of claim 5, wherein the processing engine is configured to analyze the time-varying traffic pattern to determine a time-based merchandise replenishment plan for at least one area of the store, and wherein the user interface is configured to display the time-based merchandise replenishment plan.

8. The system of claim 7, wherein the time-based merchandise replenishment plan includes at least one of: restocking the at least one area of the store during an anticipated time of lower customer activity in that at least one area of the store, or restocking the at least one area of the store after an anticipated time of higher customer activity in that at least one area of the store.

9. The system of claim 1, wherein the communications module comprises at least one of a radio frequency transceiver or a WIFI transceiver.

10. The system of claim 1, wherein the plurality of piezoelectric elements comprises an integrated circuit.

11. The system of claim 1, wherein the user interface is configured to display the time-varying traffic pattern as a heat map.

12. A method of motion sensing and energy capturing comprising:
providing a plurality of piezoelectric elements configured to be arranged in a walking surface, each of the plurality of piezoelectric elements being identifiable relative to a portion of the walking surface and activateable by activity on a corresponding portion of the walking surface;
providing a communications module configured to be coupled with the plurality of piezoelectric elements;
configuring the communications module to send activation data comprising time of activation data and related to at least one of the plurality of piezoelectric elements to a processing engine configured to process the activation data received for the walking surface over a period of time to identify a time-varying traffic pattern; and
providing an energy capture element configured to be electrically coupled with the plurality of piezoelectric elements to receive energy produced by the at least one of the plurality of piezoelectric elements when the at least one of the piezoelectric elements is activated by activity on a corresponding portion of the walking surface.

13. The method of claim 12, further comprising configuring the energy capture element to provide received energy to at least one of the communications module or the processing engine.

14. The method of claim 1, further comprising arranging the plurality of piezoelectric elements in the floor of a building, wherein the floor is the walking surface.

15. The method of claim 14, further comprising configuring the energy capture element to be electrically coupled with at least one electrical system in the building to provide received energy thereto.

16. The method of claim 14, wherein the building is a retail store and the time-varying traffic pattern is related to customer activity in the retail store.

17. The method of claim 16, further comprising configuring the processing engine to analyze the time-varying traffic pattern and identify at least one area of the store with high customer activity for additional merchandising.

18. The method of claim 16, further comprising configuring the processing engine to analyze the time-varying traffic pattern and determine a time-based merchandise replenishment plan for at least one area of the store.

19. The method of claim 18, wherein the time-based merchandise replenishment plan includes at least one of: restocking the at least one area of the store during an anticipated time of lower customer activity in that at least one area of the store, or restocking the at least one area of the store after an anticipated time of higher customer activity in that at least one area of the store.

20. The method of claim 12, further comprising providing a user interface configured to be coupled with the processing engine to display the time-varying traffic pattern as a heat map.

* * * * *